United States Patent
Turvey

(10) Patent No.: US 6,512,380 B2
(45) Date of Patent: Jan. 28, 2003

(54) CONTACTOR AND TRIP CIRCUIT THEREFOR

(75) Inventor: Simon Turvey, Birmingham (GB)

(73) Assignee: Lucas Industries Limited, Solihull (GB)

(*) Notice: Subject to any disclaimer, the term of this patent is extended or adjusted under 35 U.S.C. 154(b) by 0 days.

(21) Appl. No.: 09/803,193

(22) Filed: Mar. 9, 2001

(65) Prior Publication Data

US 2001/0052776 A1 Dec. 20, 2001

(30) Foreign Application Priority Data

Mar. 11, 2000 (GB) ............................................. 0005751

(51) Int. Cl.[7] ............................................. G01R 27/04
(52) U.S. Cl. ........................ 324/647; 361/94; 361/93.2
(58) Field of Search .......................... 361/94, 96, 93.2, 361/86; 340/657; 702/67; 324/647

(56) References Cited

U.S. PATENT DOCUMENTS

| 3,652,898 A | * | 3/1972 | Steeves | 361/86 |
| 4,996,646 A | * | 2/1991 | Farrington | 340/657 |
| 5,508,875 A | * | 4/1996 | Innes | 361/94 |
| 6,038,516 A | * | 3/2000 | Alexander | 702/67 |

* cited by examiner

Primary Examiner—Christine Oda
(74) Attorney, Agent, or Firm—Gottlieb, Rackman & Reisman, P.C.

(57) ABSTRACT

A contactor includes a switching circuit for switching a load between one or more electrical supplies, a current detector for detecting the current flowing through the load, a trip circuit for tripping the current after an interval of time which depends upon how much the current flowing through the load exceeds a predetermined amount, and a pre-trip circuit for providing an indication during said time interval that the current exceeds said predetermined amount for providing 'pre-trip' or 'near-trip' information.

19 Claims, 4 Drawing Sheets

CONTACTOR AND TRIP CIRCUIT THEREFOR

BACKGROUND OF THE INVENTION

1. Field of Invention

This invention relates to a contactor and trip circuit therefor. The contactor is operative for switching one or more high current loads between one or more electrical sources, for example an AC generator and DC batteries to ensure a constant electrical supply. A trip circuit is provided having an overload trip capability. The contactor, which may be in the form of a solid state contactor, may be used for providing interrupt free direct electrical power of, for example 150 Amps, to individual DC busses on an aircraft.

2. Description of the Prior Art

Conventional contactors may be provided with a trip capability for terminating the supply of current to a load when it exceeds a nominal operating level by a predetermined amount.

BRIEF SUMMARY OF THE INVENTION

It is an aim of the present invention to provide a contactor which is capable of providing an indication of near trip events, that is, instances where the load exceeds the nominal operating level but not by enough or for long enough to trip the supply. It is therefore an aim of the present invention to provide a contactor having a 'pre-trip' history capability.

According to the present invention there is provided a contactor comprising a switching circuit for switching a load between electrical supplies, a current detector for detecting the current flowing through the load, a trip circuit for tripping the current after an interval of time which depends upon how much the current flowing through the load exceeds a predetermined amount, and a pre-trip circuit for providing an indication during said time interval that the current exceeds said predetermined amount for providing 'pre-trip' or 'near-trip' information.

The predetermined amount may be 10% above the maximum current which the contactor can carry without overload.

The pre-trip or near-trip information may be supplied to a monitoring computer for monitoring pre-trip activity. Embodiments of the invention are advantageous in that they permit monitoring of events which give rise to an overload current which are insufficient in duration or quantum to cause the contactor to trip but which nevertheless are indicative of the state of an overload condition.

In a preferred embodiment, the trip circuit includes a function generator for converting the sensed current flow to a signal current proportional to the required interval of time. The function generator circuit preferably has a response time characteristic which varies depending on how much the current exceeds the predetermined amount. The response time characteristic is preferably such that the time from when the current breaches the predetermined amount to occurrence of the eventual trip decreases as excess of the current over the predetermined amount increases. The time characteristic preferably resembles the $I^2T$ relationship of a bimetallic strip in which the heating characteristic of the strip varies with the square of the current I flowing through it (temperature is proportional to the square of the current multiplied by the resistance), where T is the trip time.

The trip circuit may be configured to generate a digital-type output representing respective ones of a plurality of trip time intervals each corresponding to a sub-range of $I^2T$ overloads. The function generator circuit may be provided with a pulse generator for generating pulses at a frequency which depends on the range of current overload. A counter is provided for generating a trip signal when a set number of pulses have been counted, the time interval being a function of the pulse frequency and the set number. The set number and frequency can be varied depending upon the required trip time interval for a given current overload. Conceivably, alternative parameters may be used to govern the time intervals, such as pulse amplitude and/or width in addition to or instead of frequency.

The function generator may include a current indicator for indicating the presence of current flowing through the load at levels below the nominal value. For example, the indicating means may indicate current at 10% of a 150 Amp nominal rating. An absolute overload current detector may additionally be provided for detecting substantial over currents arising from, for example, short-circuits and the like. The absolute overload current detector can be operative to cause the contactor to trip instantly. The detector may be configured to respond to overload currents in the order of 1000% of the nominal rating.

The current detector preferably includes two Hall effect transducers which sense the current in a power stage to which the contactor is coupled. One of the Hall effect transducers has a relatively high sensitivity for sensing low level currents and the other a lower sensitivity for high currents. Alternatively, a single resistive sensor may be used. Hall effect transducers are chosen with ranges to improve measurement accuracy around the trip threshold. Additional calibration may be necessary for alternative sensors.

The contactor embodying the present invention is provided with a trip recovery delay operative for holding the tripped state for a predetermined period of time to allow for cooling. After the trip recovery delay, the tripped contactor may be manually overridden or operated under control of an external computer.

The predetermined period of time may vary in dependence upon the extent of the overload which gave rise to the trip.

According to the present invention, there is also provided a trip circuit for a contactor, the trip circuit comprising means for tripping a supply of current after an interval of time which depends upon how much the current flowing through a load exceeds a predetermined amount, and a pre-trip circuit for providing an indication during said time interval that the current exceeds said predetermined amount for providing 'pre-trip' or 'near-trip' information.

Embodiments of the invention have the advantage that they provide for a quantitative monitoring of pre-trip events for diagnostic purposes.

BRIEF DESCRIPTION OF THE DRAWINGS

The invention will now be further described by way of example, with reference to the accompanying drawings, in which.

DETAILED DESCRIPTION OF THE INVENTION

Figure 1:
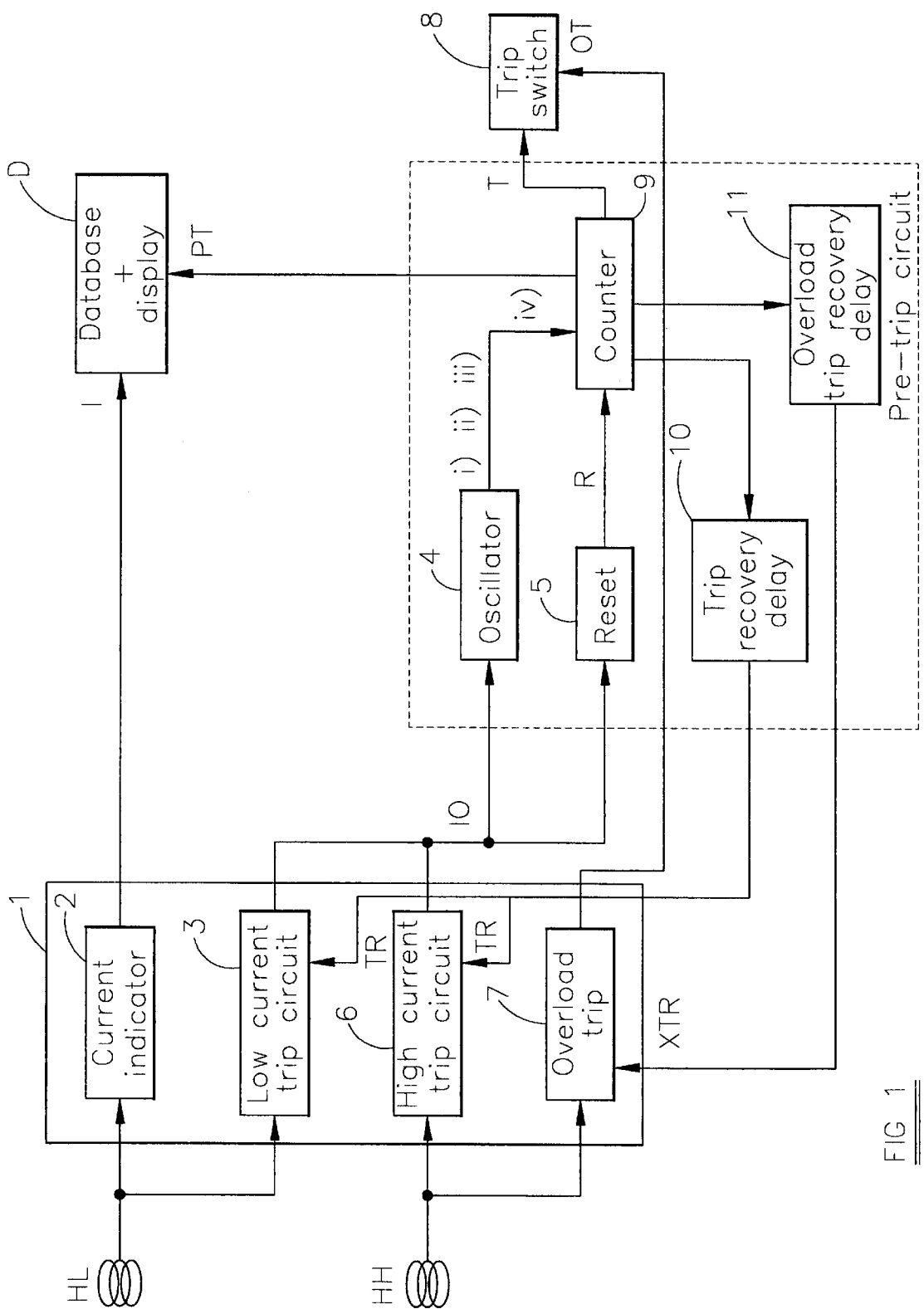
FIG. 1 is a block diagram of a trip circuit for a contactor embodying the present invention.

In FIG. 1 a trip circuit and pre-trip circuit embodying the present invention is shown in block schematic form. In this embodiment, a pair of Hall effect transducers HL and HH generate outputs indicative of the current passing through a load to which the contactor is coupled. The two Hall effect transducers HL and HH are scaled for high accuracy at low current levels and reduced accuracy at high current levels respectively. For example, in the case where the trip current is defined as 150 Amps, Hall effect transducer HL is arranged for sensing nominally 0% to 250% of the trip current. Hall effect transducer HH is set for sensing nominally 0% to 1000% of the trip current. This arrangement is used to achieve the required accuracy over the extended operational range. Alternatively, in place of the Hall effect transducers, a single sensor design may be adopted through use of a resistive sensing means. This would combine the function generator inputs but retain all the functional blocks.

The trip circuit includes a function generator 1 which includes a current indicator 2 for receiving the output from the low current Hall effect transducer HL and provides an output I to indicate the presence of a current on the load even though this may be only 10% of the nominal value. This output is supplied to a database and display D which monitors the detection of the load on the current and displays appropriate information. The function generator 1 also includes a low current trip circuit 3 which also receives the output of the low current Hall effect transducer HL and generates an output IO at a first level, this being fed to an oscillator 4 and reset 5. The load current trip circuit 3 produces the output IO when the magnitude of the current sensed in the load by the low current Hall effect transducer HL exceeds the predetermined amount by a relatively low level. In this case, the circuit does not trip immediately but after a relatively long time interval as described in more detail below. In the event that the current sensed on the load exceeds the predetermined amount more significantly, the high accuracy Hall effect transducer HH is sufficient to cause a high current trip circuit 6 to generate a higher level output IO than the one generated by the low current trip circuit 3. These two outputs are summed and both are also fed to the oscillator 4 and the reset 5.

The function generator 1 is provided with an overload trip 7 which is operative for generating a trip signal OT fed directly to a trip switch 8 in the event that the load sensed by the Hall effect transducer HH senses a catastrophic overload of, for example, 1000% of the nominal value. The trip switch 8 may be implemented by one or more field effect transistors. Each of the low and high current trip circuits 3 and 6 can provide various levels of output signal IO depending on the magnitude of the current sensed by its respective Hall effect transducer HL, HH as will be described in more detail below with reference to FIGS. 4 and 5. The output signal IO can therefore have a range of different values depending on the current level sensed by the Hall effect transducers. Given that the low and high current trip circuits 3 and 6 are configured to generate an output when the sensed current flowing through the contactor exceeds a predetermined amount, each level of output IO will correspond to a different time interval to establish the trip.

Figure 3:
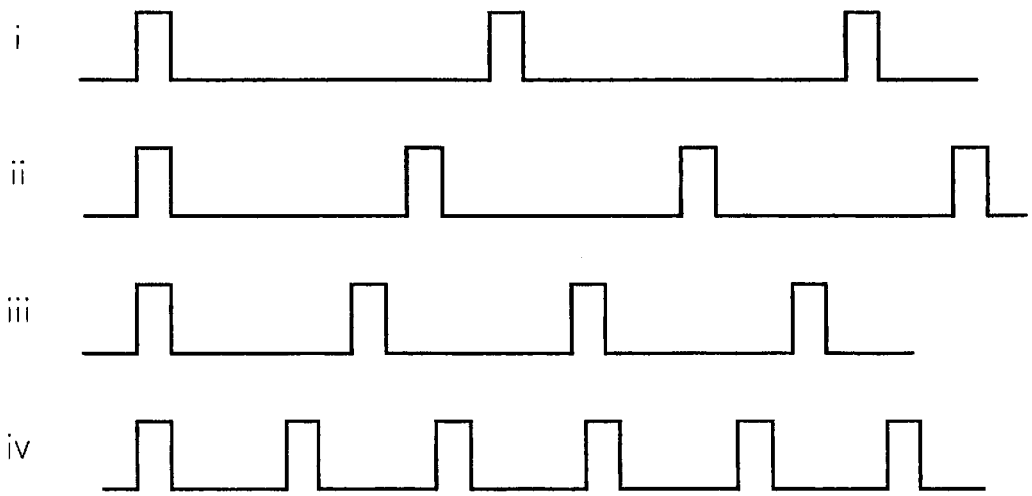
FIG. 3 shows the oscillator output for four different current levels.

The oscillator 4 is configured to generate a range of pulse trains, the frequency of which depend on the level of the signal IO received by the oscillator 4. The trip circuit is provided with a counter 9 operative for counting the pulses received from the oscillator 4. When a preset number of pulses is counted, the counter 9 generates a trip signal T which is fed to the trip switch 8 for tripping the supply of current to the load. FIG. 3 shows the oscillator output for four different current levels. When the overload current sensed by Hall effect transducers is low, the output IO corresponds to pulse trains i or ii of FIG. 3. In this case the preset number of counts will take longer to reach than it will if the high current trip circuit 6 generates a relatively high level output IO thereby causing the oscillator 4 to generate pulse trains with higher frequencies as illustrated by the trains iii and iv of FIG. 3.

The counter 9 is operative for generating a pre-trip signal PT each time a pulse is counted. Consequently, the database and display D is informed of the existence of an overload while the counter 9 is counting its way to the preset number of counts which gives rise to generation of the trip signal T. The number and frequency of the pre-trip signals PT supplied to the database and display D will be indicative of the pre-trip overload condition. This information is stored in the database and can be used for diagnostic purposes.

When the Hall effect transducers HL, HH no longer sense an overload, the output IO will fall accordingly. The input to the reset 5 will therefore cross its threshold giving rise to generation of a reset signal for resetting the counter 9 so preventing pre-trip events accumulating over a long period and resulting in a spurious trip. If however a trip does occur, before the trip is reset, it is desirable for the trip circuit to be maintained in a tripped state for a predetermined period of time to allow for cooling of circuit components which have been heated by the overload. A trip recovery delay 10 is provided to generate a trip recovery signal when the counter 9 has generated a trip signal T. The trip recovery signal TR is supplied to trip circuit 3 of the function generator I for holding the output IO active for the predetermined period of time. In the event that a catastrophic overload current is detected, giving rise to generation of an overload trip signal OT, an overload trip recovery delay 11 generates an overload trip recovery signal XTR which is supplied to the overload trip 7 to maintain the generation of the overload trip signal TO for a longer predetermined period of time.

Figure 2:
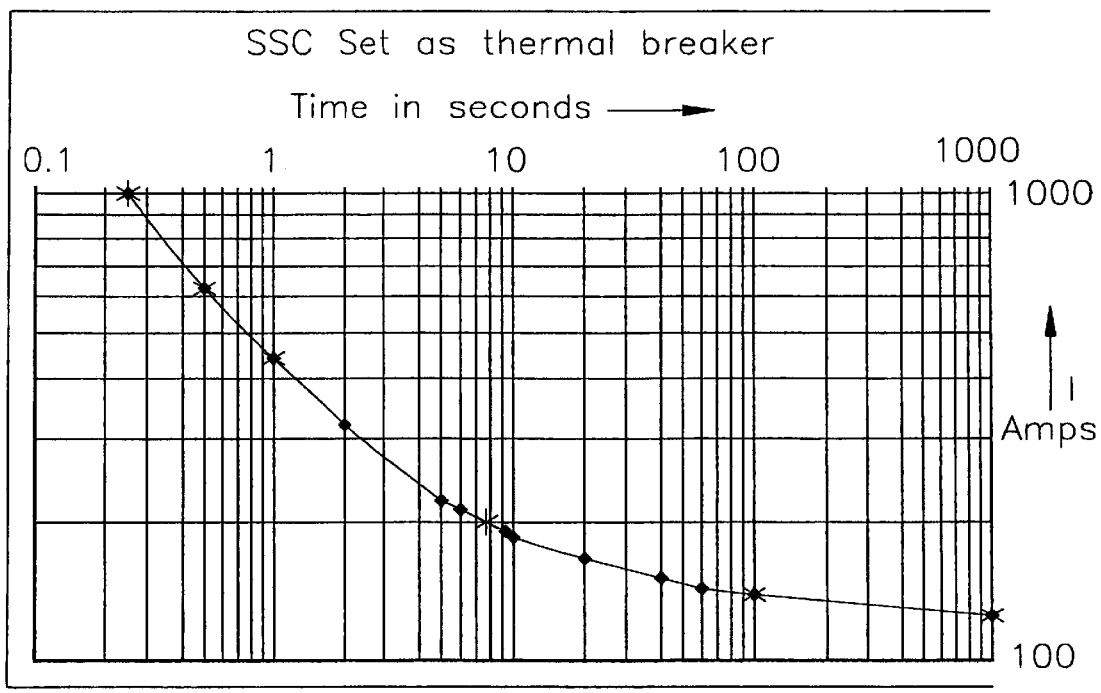
FIG. 2 is a graph showing how trip times may vary in relation to sensed current in the trip circuit embodying the present invention in the case where the function generator circuit is set to have the characteristic of a thermal circuit breaker.
Figure 4:
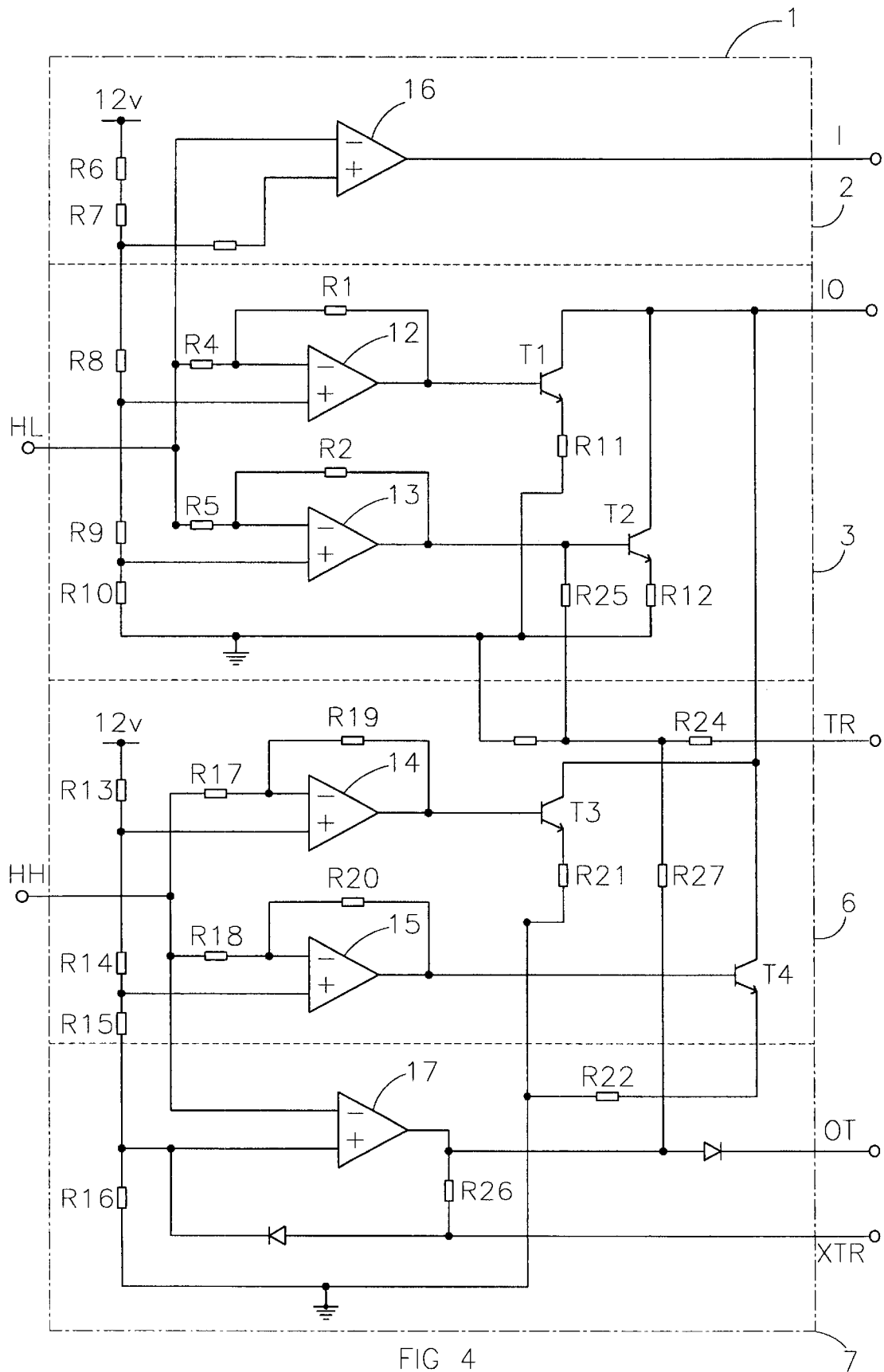
FIG. 4 is a circuit diagram of a function generator which may be employed in a trip circuit embodying the present invention.

FIG. 4 shows more detailed circuit components which may be adopted in the function generator 1. The purpose of the function generator, with the timer circuit, is to obtain a time to trip characteristic similar to that shown in FIG. 2. This function generator circuit 1 generates a signal IO which is proportional to the square of the current detected by the Hall transducers HL and HM. The low current portion of the function generator circuit 3 comprises a pair of operational amplifiers 12, 13 which receive the output from the low current Hall effect transducer HL. Respective outputs of the operational amplifiers 12, 13 are fed back to their non-inverting inputs via resistors R1 and R2 respectively so that a current proportional to the voltage of the Hall effect transducer HL is generated over a predefined range. The output of the Hall effect transducer HL is fed to the non-inverting input of the operational amplifiers 12, 13 via resistors R4 and R5 respectively. The positive inputs of the operational amplifiers 12 and 13 are derived from a potential divider formed from resistor chain R6 to R10. The values of the components are chosen so that relatively low current overload values are divided into two subranges. When the Hall effect transducer HL voltage corresponds to a load current within the lowest sub-range, the output of operational amplifier begins to rise from zero and having crossed the base emitter threshold of T1 will start to produce a current IO proportional to the rising voltage. When the voltage of the Hall effect transducer HL is within the next sub-range, the output of operational amplifier 13 begins to rise and a similar but larger proportional current is produced. This current is added to the existing IO which has by now reached its limiting value. The difference in current values produced by T2 over T1 is set by the relative values of R11 and R12. The high current circuit 6 has a similar arrangement of operational amplifiers 14 and 15. The positive inputs of these are coupled to a voltage divider made up of resistor chain R13 to R16. The voltage output of the Hall effect transducer HH is coupled to respective non-inverting inputs of the operational amplifiers 14 and 15 via respective resistors R17 and R18. The output of the operational amplifiers 14 and 15 are respectively fed back to the non-inverting input via resistors R19 and R20. The values of resistors R17 to R20 are chosen so that the output of operational amplifier 14 begins to rise when the voltage at the Hall effect transducer HH falls within a third sub-range and that output of the operational amplifier 15 begins to rise when the voltage output of HH falls within a fourth sub-range. As each amplifier output rises, it produces a further range of proportional currents in T3 and T4 respectively. Each range of current being set by the values of R21 and R22 respectively. These further currents are summed to the signal IO. If a single sensing element is used, the functionality remains the same, but the inputs HL and HH are combined.

The result of the summed current, that is IO, is to discharge capacitor C1 towards ground potential at a rate which is proportional to the square of the level of detected overload current.

FIG. 4 also shows details of circuit components which may be adopted for the current indicator 2 and the overload trip 7. The current indicator 2 comprises an operational amplifier 16 which generates a fixed output i when the voltage received at its non-inverting input exceeds a level such as to indicate the presence of a load. The overload trip 7 comprises a further operational amplifier 17 and is operative for generating an output OT when a catastrophic overload in the order of 1000% of the nominal value is detected by the Hall effect transducer HH.

When the trip recovery signal TR is generated, R24 provides a voltage to the base of the transistor T2 so setting the rate of the normal recovery clock. In the event of a catastrophic overload, giving rise to generation of the overload OT, resistor R27 performs the role of R24 until OT is reset by input XTR.

Figure 5:
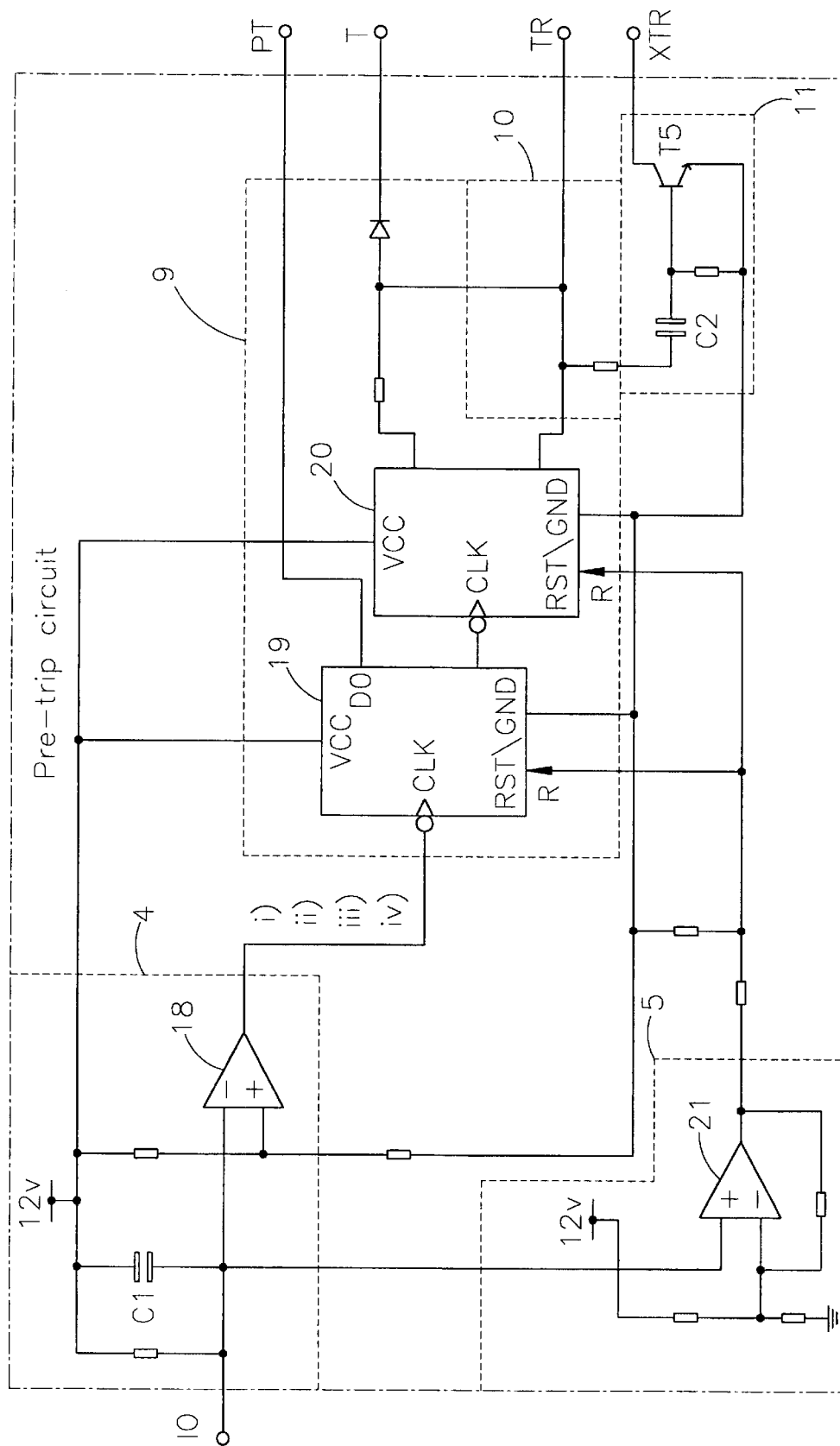
FIG. 5 is a circuit diagram of a trip time generator which may be employed in the trip circuit embodying the present invention.

FIG. 5 illustrates the main components which may be adopted in the pre-trip circuit embodying the invention. The oscillator 4 is connected to the input IO that sinks current to ground as an $I^2T$ function as discussed above with reference to FIG. 4. The effect of the function generator 1 is to discharge capacitor C1 towards ground potential at a rate which is proportional to the square of the level of detected overload current. Capacitor C1, operational amplifier 18 and associated resistors form a relaxation oscillator circuit 4. The frequency of this oscillator is proportional to the current discharged from the capacitor C1 by function generator 4. With no current overload, the frequency of the oscillator is zero using as detected current IO. The pulse train from oscillator 4 is coupled to the clock CLK input of a counter 19. Every time a pulse is received at the clock CLK terminal, a pre-trip signal is generated and supplied to the database and display D for monitoring. After a pre-set number of counts, the clock generator 19 generates an output which is supplied to a second clock generator 20 which in turn gives rise to generation of a trip signal T which is supplied to the trip switch 8. The time taken to generate the trip signal T is therefore dependent on the frequency of the pulse trains i to iv which in turn depends on which sub-range the overload current corresponds to. In the event that the overload current ceases, the transistors T1 through T4 of FIG. 4 would switch off but T2 remains active by the action of R24 and R27 until, in order to allow for cooling of components which have been heated by the overload current, the counters 19 and 20 complete a full cycle. Once the counters have complete the full cycle, line TR goes low, T2 is switched off and oscillator 4 stops.

The reset circuit then operates as the voltage across C1 in oscillator 4 decays towards rail and counters 19 and 20 are fully reset. Only when TR has gone low is it possible to either manually or under computer control, reset the trip switch 8 and attempt to recover the load function.

What is claimed is:

1. A contactor comprising:
   a switching circuit for switching a load between one or more electrical supplies;
   a current detector for detecting a current flowing through the load;
   a trip circuit for tripping said current after an interval of time which depends upon how much said current exceeds a predetermined amount;
   an indication circuit for providing an indication indicative near-trip information, said indication being generated for instances for which, during said time interval, said current has exceeded said predetermined amount but which is insufficient to activate said trip circuit; and
   a store for storing said indication for diagnostic purposes;
   wherein said trip circuit includes a function generator for converting said current to a signal current proportional to said interval of time.

2. A contactor according to claim 1, wherein said near-trip information is supplied to a monitoring computer.

3. A contactor according to claim 1, wherein the function generator circuit has a response time characteristic which varies depending on how much the current exceeds the predetermined amount.

4. A contactor according to claim 3, wherein the time characteristic resembles the $I^2T$ relationship of a bimetallic strip in which the heating characteristic of the strip varies with the square of the current I flowing through it, where T is the trip time.

5. A contactor according to claim 4, wherein said trip circuit is configured to generate a digital output representing respective ones of a plurality of trip intervals, each corresponding to a sub-range of $I^2T$ overloads.

6. A contactor according to claim 1, wherein the function generator circuit is provided with a pulse generator for generating pulses at a frequency which depends on the range of current overload.

7. A contactor according to claim 6, wherein a counter is provided for generating a trip signal when a set number of pulses have been counted, the time interval being a function of the pulse frequency and the set number.

8. A contactor according to claim 7, wherein the set number and frequency can be variable depending upon the trip time interval for a given current overload.

9. A contactor according to claim 7, wherein the time intervals are governed by pulse amplitude and/or width in addition to or instead of frequency.

10. A contactor according claim 1, wherein the function generator includes a current indicator for indicating the presence of current flowing through the load at levels below the nominal value.

11. A contactor according to claim 1, wherein an absolute overload current detector is additionally provided for detecting substantial over currents.

12. A contactor according to claim 11, wherein the absolute overload current detector is operative to cause the contactor to trip instantly.

13. A contactor according to claim 1, wherein the current detector includes at least two Hall effect transducers which sense the current in a stage to which the contactor is coupled, a first one of the Hall effect transducers having a relatively high sensitivity for sensing low level currents and a second one of the Hall effect transducers having a lower sensitivity for high currents.

14. A contactor according to claim 1, comprising a trip recovery delay operative for holding the tripped state for a predetermined period of time to allow for cooling.

15. A contactor according to claim 14, wherein the predetermined period of time may vary in dependence upon the extent of the overload which gave rise to the trip.

16. A trip circuit for a contactor, the trip circuit comprising:
   means for tripping a supply of current after an interval of time which depends upon how much the current flowing through a load exceeds a predetermined amount; and
   a near-trip circuit for providing an indication during said time interval that the current exceeds said predetermined amount in instances where the current exceeds said predetermined amount by an amount which is insufficient to trip the supply for providing 'near-trip' information, wherein:
   said trip circuit includes a function generator for converting the sensed current flow to a signal current proportional to the interval of time; and
   the 'near-trip' information is for supply to a monitoring computer for monitoring 'near-trip' activity for diagnostic purposes.

17. A contactor comprising;
   a switching circuit for switching a load between one or more electrical supplies;
   a current detector for detecting the current flowing through the load;
   a trip circuit for tripping the current after an interval of time which depends upon how much the current flowing through the load exceeds a predetermined amount;
   the trip circuit including a function generator for converting the sensed current flow to a signal current proportional to the interval of time, and
   a near-trip circuit for providing an indication during said time interval that the current exceeds said predetermined amount for providing 'near-trip' information, whereby the contactor permits the monitoring of events which give rise to an overload current which are insufficient in duration or quantum to cause the contactor to trip but which nevertheless are indicative of the state of an overload condition.

18. A contactor comprising:
   a switching circuit for switching a load between one or more electrical supplies;
   a current detector for detecting a current flowing through the load;
   a trip circuit for tripping said current after an interval of time which depends upon how much said current exceeds a predetermined amount; and
   an indication circuit for providing an indication indicative near-trip information, said indication being generated for instances for which, during said time interval, said current has exceeded said predetermined amount but which is insufficient to activate said trip circuit;
   wherein said current detector includes at least two Hall effect transducers which sense the current in a power stage to which the contactor is coupled, a first one of the Hall effect transducers having a relatively high sensitivity for sensing low level currents and a second one of the Hall effect transducers having a lower sensitivity for high currents.

19. A trip circuit for a contactor, the trip circuit comprising:
   means for tripping a supply of current after an interval of time which depends upon how much the current flowing through a load exceeds a predetermined amount; and
   a one-trip circuit for providing an indication during said time interval that the current exceeds said predetermined amount for providing 'pre-trip' information;
   wherein said trip circuit includes a function generator for converting the sensed current flow to a signal current proportional to the interval of time; and
   said 'pre-trip' information is for supply to a monitoring computer for monitoring 'pre-trip' activity for diagnostic purposes.

* * * * *